United States Patent [19]
Koch et al.
[11] 4,404,101
[45] Sep. 13, 1983

[54] EXTRACTION DEVICE FOR REMOVING LIQUID FROM A LIQUID-SOLID MIXTURE

[75] Inventors: Klaus Koch; Hans-Joachim Schaeffer, both of Laatzen; Gerhard Syrbius, Grossburgwedel, all of Fed. Rep. of Germany

[73] Assignee: Hermann Berstorff Maschinenbau GmbH, Hanover, Fed. Rep. of Germany

[21] Appl. No.: 376,103

[22] Filed: May 7, 1982

[30] Foreign Application Priority Data

May 12, 1981 [DE] Fed. Rep. of Germany ....... 3118715
Oct. 10, 1981 [DE] Fed. Rep. of Germany ....... 3140341

[51] Int. Cl.[3] ...................... B01D 23/20; B01D 33/18
[52] U.S. Cl. .................................. 210/232; 210/241; 210/297; 210/298; 210/323.2; 210/330; 100/117
[58] Field of Search .............. 210/202, 203, 204, 232, 210/234, 235, 237, 241, 295, 297, 298, 299, 323.1, 323.2, 324, 327, 330, 332, 341, 359, 391, 398, 399, 407, 413, 414, 415, 450; 100/104, 117, 127; 162/56

[56] References Cited

U.S. PATENT DOCUMENTS

| | | | |
|---|---|---|---|
| Re. 27,230 | 11/1971 | Farmer | 100/117 |
| 2,452,638 | 11/1948 | Drum | 210/330 |
| 3,176,606 | 4/1965 | Zoffman | 100/117 |
| 3,833,123 | 9/1974 | Walker | 210/241 |
| 3,943,034 | 3/1976 | Wallen | 100/117 |
| 4,260,488 | 4/1981 | Condolios | 100/117 |

FOREIGN PATENT DOCUMENTS

| | | | |
|---|---|---|---|
| 1577215 | 9/1970 | Fed. Rep. of Germany | 100/117 |
| 2090542 | 5/1982 | United Kingdom | 100/117 |
| 351888 | 9/1972 | U.S.S.R. | 100/117 |

*Primary Examiner*—Ernest G. Therkorn
*Attorney, Agent, or Firm*—Schwartz, Jeffery, Schwaab, Mack, Blumenthal & Koch

[57] ABSTRACT

An extraction device for treating liquid-solid mixtures such as sewage sludge or paper pulp to remove liquid therefrom, includes a preliminary treatment station. The preliminary treatment station comprises at least two interchangeable perforated containers located on a displaceable receiver turntable beneath which a stationary disc is coaxially located. The stationary disc is provided with an aperture eccentrically disposed thereon, the aperture having a cross-sectional area corresponding to the cross-sectional area of the lower end of the container located on the turntable and to the cross-sectional area of an inlet aperture provided in the extraction device.

By rotating the receiver turntable in a timed sequence a container is always moved beneath a filler tube, filled and further rotated. The solid components drop to the bottom of the container and liquid is discharged through the perforations provided in the container and the mixture thus has liquid removed in a preliminary treatment. The solid-containing mixture is finally passed over then fed into a conventional extraction device. In a subsequent cycle, the next perforated container is filled, and a preceding container is emptied by being displaced until it is located above the filler aperture of the extraction device.

16 Claims, 12 Drawing Figures 1
2
3
4
5
6
7
8
9
10
11
12
15
16
17
18
19
20
21
22
23
51

Fig.10
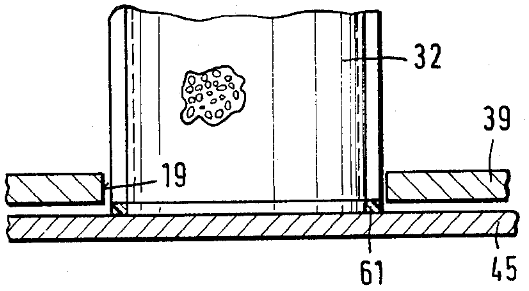
Fig.11
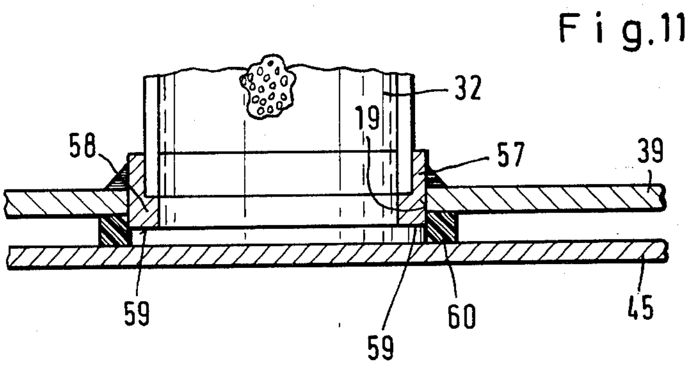
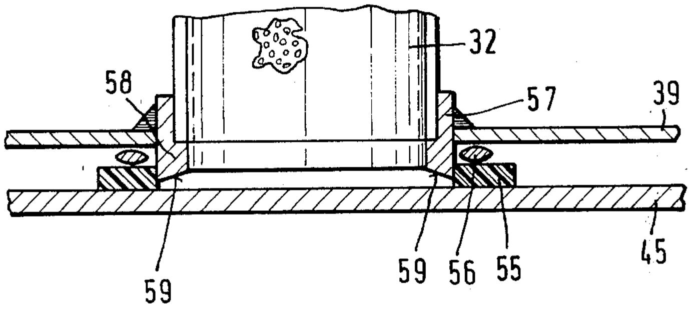
Fig.12

EXTRACTION DEVICE FOR REMOVING LIQUID FROM A LIQUID-SOLID MIXTURE

The present invention relates to an extraction device for removing liquid from a solid-liquid mixture, the device being primarily, but not essentially, intended for use in removal of liquid from sewage sludge or paper pulp. The device includes a preliminary treatment station having an outlet aperture which communicates with the inlet aperture of the extraction device.

In German Offenlegungsschrift No. 1 577 215, there is disclosed a press which includes a preliminary treatment station. Such treatment station comprises two press screws arranged in a housing. A viscous suspension of fibrous material is pre-pressed by means of this press and the material is thereafter conveyed to a further screw press in order to effect further extraction.

Such a preliminary treatment device is, however, costly to operate and also has a limited receiver capacity. In addition, a suspension of solid matter, having a high water content of the order of, for example, 95%, can only be treated to produce a higher dry-substance content uneconomically. This is because the suspension is too dilute and therefore offers little resistance to the flights of the extraction screw. Accordingly, very little liquid is extracted.

The present invention seeks to provide an extraction device which has a high receiver capacity and which can be operated with low energy costs. The invention also seeks to provide a device in which the preliminary treatment station is of a relatively simple and robust construction and mode of operation, and which will achieve a preliminary liquid removal of 5% or more whilst still permitting the extraction device to be continuously operated.

According to the present invention, there is provide an extraction device for extracting solid matter from a solid-liquid mixture such as sewage sludge or paper pulp the device including a preliminary treatment station having an outlet in communication with the inlet of the extraction device, the preliminary treatment station comprising a drivable receiver turntable and a stationary disc concentrically disposed beneath the turntable, the disc having an aperture eccentrically formed therein the receiver turntable having at least two perforated, operated containers located thereon, the containers, in use, being disposed vertically, the cross-sectional area of the outlet end of the container corresponding to the cross-sectional area of the aperture in the stationary disc, the disc having upstanding wall portions around its periphery so as to act simultaneously as a collection device for separated liquid emerging through the perforations in the perforated containers, the collection device including means for discharging the separated liquid.

By providing a receiver turntable, having at least two perforated containers located thereon and a stationary disc which is coaxially disposed beneath the turntable and has an eccentrically disposed aperture formed therein, the cross-section of the aperture corresponding to the cross-sectional area of the outlet end of the perforated containers, a standing mixture or suspension of solid matter and water can have a portion of the liquid removed therefrom in a preliminary treatment, the partially extracted mixture then being transferred to the extraction device when the perforated container in which it has been allowed to stand is located above the aperture in the stationary disc.

Whilst this is occuring, more of the material can be poured or fed into another of the perforated containers located on the turntable. A large portion of the liquid flows away through the holes provided in the container walls, which liquid is collected and conducted away by the stationary disc which also has apertures formed therein and acts simultaneously as a collection funnel or vessel.

When preliminary liquid removal is effected in this manner and each container is displaced in turn so as to locate above the eccentrically disposed aperture in the stationary disc by means of the driven turntable, the contents of the containers are transferred to the extraction device located therebeneath.

If, for example, a plurality of perforated sheet containers are provided for the preliminary liquid removal, and the containers are located in a circular arrangement so as to be displaced over the aperture in the stationary disc in succession, the containers can be emptied and then filled with more mixture immediately thereafter and substantially continuous preliminary liquid removal is achieved with a high receiver capacity.

It is obvious that, the larger the receiver turntable and the stationary disc the greater the receiver capacity for the preliminary treatment station.

Since only an appropriately controlled drive is required for the receiver turntable, the energy costs incurred are low.

Because the above-described arrangement is simple and robust, it is less likely to malfunction and the continuous preliminary removal of liquid is ensured. The arrangement is particularly suitable for treating sewage sludge having a dry substance content of from 4% to 10%.

Preferably the preliminary treatment station is disposed above the extraction device, the extraction device being a screw press, a screen belt press or a decanter, the eccentrically disposed aperture in the stationary disc being circular in cross-section, the cross-sectional area of the eccentrically disposed aperture being selected so as to correspond to the cross-sectional area of the inlet aperture of the extraction device.

Desirably, the perforated containers are detachably mounted on the turntable so as to be capable of being replaced or interchanged, the containers being a cylindrical, conical, oval or rectangular in shape, the eccentrically disposed aperture in the stationary disc and the inlet aperture in the extraction device corresponding, in both cross-sectional area and shape, to the cross-sectional area and shape of the outlet end of the perforated container.

If liquid-solid mixtures in which the particles of solid matter are very small are to be treated it is advantageous if, in addition, a screen fabric or a filter cloth is provided on the internal surface of the perforated containers.

Further preferably, there is provided a cleaning or discharge device, the cleaning device being in the form of a piston rod having a brush, or ram mounted thereon, such device being pneumatically or hydraulically actuable and being so mounted as to be axially displaceable in the perforated containers.

Depending upon the type of suspension of fibrous material which is to have liquid extracted therefrom, the ram may, therefore, act as a stopper, may clean the container walls, may pre-compact the contents of the container and, finally, may be used to discharge the contents of the container into the extraction device located therebeneath.

In a preferred embodiment of the invention, there is provided the receiver turntable is in the form of a cylindrical container having a cover or lid, the perforated containers being disposed therein in a circular arrangement, a drive device for causing rotational movement of the receiver turntable being arranged centrally at the upper end of the container on the container cover or lid. In this embodiment, the drive unit may be a drive pinion which is located centrally at the upper end of the container on the cover or lid therefore and with which pinions a suitable drive unit engages.

Further advantageously discharge apertures are provided in the receiver turntable and in the stationary disc arranged concentrically beneath the turntable, the apertures in the turntable and disc each being disposed in the central region and/or in the outer peripheral region thereof.

Further desirably, a funnel-shaped collection container or an annular, encircling discharge channel is provided beneath the stationary disc. Whichever of these discharge devices is used is in communication with the respective discharge apertures provided in the disc.

Since the perforated sheet containers are rotated on the stationary disc by means of the receiver turntable, that is to say, they slide on the stationary disc, it is difficult to ensure a satisfactory peripheral sealing between the lower or outlet rim of the containers and the stationary disc.

Accordingly, it is desirable if each tubular perforated container is disposable into the through-aperture provided in the receiver turntable, the container located in said aperture being provided with a seal directed towards the stationary disc.

Due to the peripheral sealing of the tubular perforated containers being located in the apertures provided in the receiver turntable, it is ensured that no solid components can enter the discharge system for the extracted liquid.

Blockages, and the cleaning operations necessitated thereby, are therefore eliminated.

To enable the containers to be replaced or interchanged more easily, whilst at the same time providing good sealing, it is preferred if a receiver ring for receiving the perforated sheet containers is arranged in through aperture in the receiver turntable, the receiver ring having a projecting rim on its edge directed towards the stationary disc, and being adapted to be sealable against the stationary disc.

Desirably, in such a case, a resilient or elastic seal made of plastics material is provided, the resilient seal being arranged around the projecting rim of the receiver rim, the seal projecting beyond the lower edge of the rim to provide a seal between the receiver ring and the stationary disc.

In an advantageous embodiment, a plastics material ring is disposed around the projecting rim the ring projecting beyond the lower edge of the receiver ring a resilient roller cage or ring is arranged between the plastics material ring and the underside of the receiver turntable rim of the receiver ring. A non-resilient flat plastics ring having a low coefficient or friction and made, for example, of polyethylene may be mounted on the resilient ring.

During the rotation of the receiver turntable, the plastics ring slides on the stationary disc and is pressed towards the stationary disc by the roller ring or the rubber profile. This ensures that good sealing, whilst still permitting good sliding of the containers, is achieved.

Two embodiments of an extraction device in accordance with the present invention are shown very diagrammatically, by way of example, in the accompanying drawings, in which:

FIG. 1 is a longitudinal sectional view through a portion of an extraction device in accordance with the present invention, the device including a preliminary treatment station which is shown in perspective, FIG. 2 shows a filler tube for conveying material to the preliminary treatment station showing FIG. 1, the tube having a stocking-like filter hose attached thereto, FIG. 3 is a plan view of a stationary disc member having an eccentric aperture provided therein, the disc forming part of the preliminary treatment station shown in FIG. 2, FIG. 4 is a plan view of an alternative form of a receiver turntable utilisable the preliminary treatment station shown in FIG. 1.

FIG. 5 shows a container formed from a perforated sheet which forms part of the preliminary treatment station shown in FIG. 1, the container having a conical shape, FIG. 6 shows a container similar to that shown in FIG. 5, but having a rectangular cross-section, FIG. 7 is a longitudinal sectional view through a second embodiment of an extraction device including a preliminary treatment station, this station including a receiver turntable in the form of a cylindrical container.

FIG. 10 shows a seal for sealing a perforated sheet container forming part of the preliminary treatment station shown in FIGS. 1 and 7.

FIG. 11 shows an alternate form of seal to that shown in FIG. 10, and

FIG. 12 is a view, on an enlarged scale, of the portion marked in FIG. 7.

Figures 1, 2:
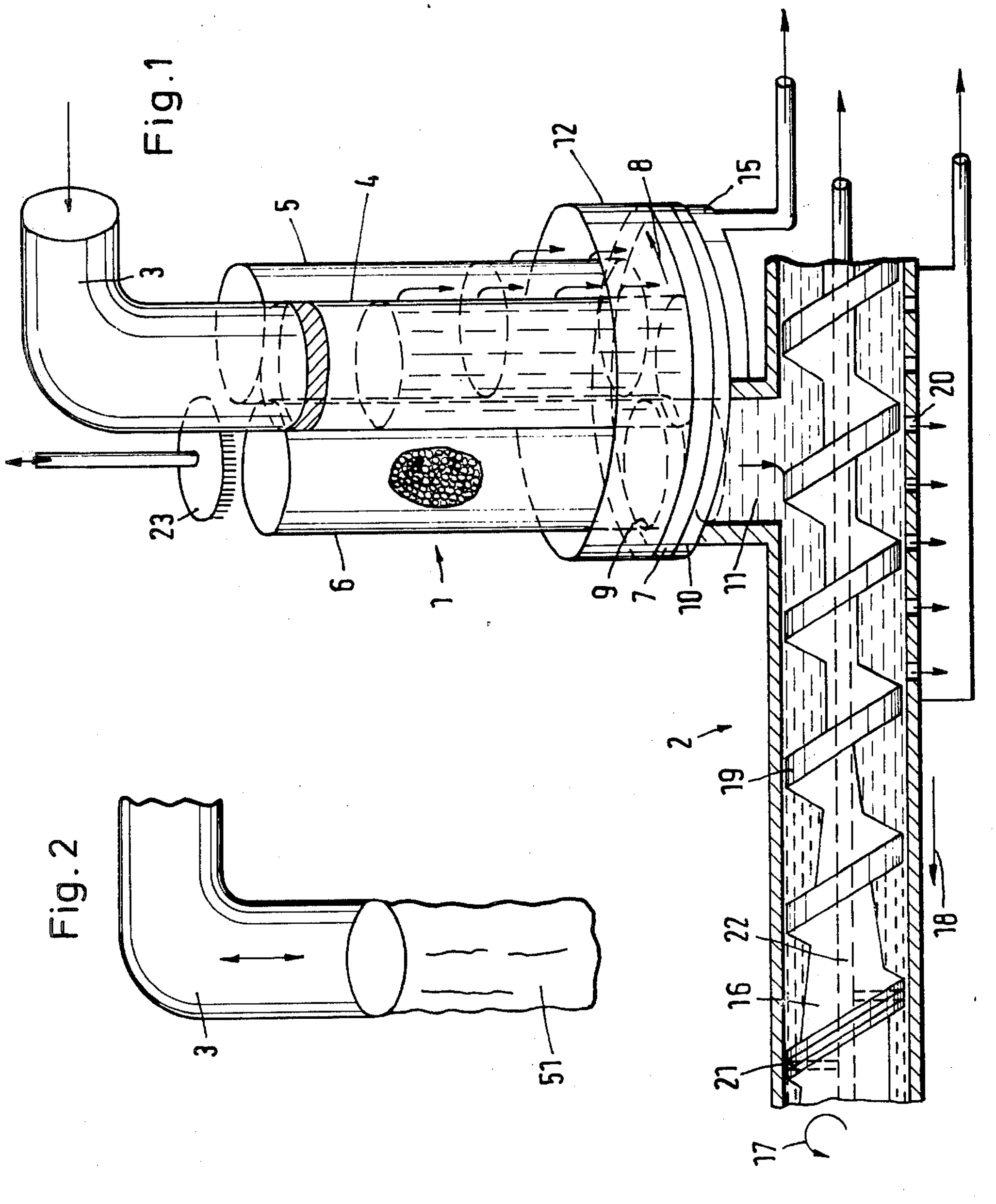

In FIG. 1, there is shown an extraction device in accordance with the present invention comprising a preliminary treatment station 1. The major portion of the extraction device in the form of a screw press 2. The extraction device could also be a screen belt press or a decanter. A mixture which is to have liquid removed therefrom, such as fibre-containing sewage sludge having an approximately 5% dry-substance content, is introduced into the extraction device through a filler tube 3. From the tube 3, the mixture passes into a container 4 formed from a perforated plate. The liquid flows through the perforated container wall, so that the level of the mixture in the tube 3 drops within a short period of time.

Three such containers 4,5 and 6 are shown in FIG. 1. These containers are rotated simultaneously in the direction of the arrow 8 by means of a receiver turntable 7 so that, as shown, the container 6 becomes located beneath the outlet from the filler tube 3 at the same time as the outlet from the container 5 passes over an aperture 9 provided in a stationary disc 10. If the mixture to be extracted contains particles of very small size, the interior of each container may be provided with a fabric screen or filler cloth (not shown).

In the meantime, the level in the container 4 has dropped still further, and the dry-substance content of the mixture contained therein will have increased to approximately 10 to 15%.

By further rotating the receiver turntable 7, the outlet end of the container 4 now becomes located over the aperture 9, so that the contents of the container 4, which have been subjected to such preliminary liquid extraction, is discharged into a receiver chamber 11 of the screw press 2.

The liquid which emerges from the aperture or perforations provided in the perforated sheet containers 4, 5 and 6 is collected in a chamber defined by a stationary disc 10 and a sleeve-like encircling rim 12 fixedly connected thereto. The liquid passes through apertures 13, shown in FIGS. 3 and 4, formed in the receiver turntable 7 and through apertures 14 provided in the disc 10 into an encircling discharge channel 15 which is located beneath the disc 10 and is fixedly connected thereto.

The screw 16 of the screw press 2 rotates in the direction of the arrow 17. The screw 16 collects the preliminary—treated liquid-solid mixture entering the chamber 11 and convey it in the direction of the arrow 18. The mixture is further compressed by the flights of the screw 16, so that a further extraction effect is achieved.

Any liquid extracted in the feed or upstream portion of the screw press is discharged through filter apertures 20. Liquid further removed by the action of the screw 16 is discharged in the front or downstream portion of the screw press 2 through the radial bores 21 provided in the flight of the screw 16, which bores 21 in communication with an axial bore 22 formed in the screw 16. Depending on the material being extracted, the mixture leaving the screw press 2 has a dry-substance content of up to 90%.

In the preliminary treatment section, a plunger or ram 23 is provided. Desirably, but not essentially, this ram 23 is aligned with one of the container positions when the turntable 7 is rotated. The container 4, 5 or 6 located therebeneath can, in such circumstances, be emptied or cleaned, or the contents thereof may be pre-compacted by the ram 23. The ram 23 may be in the form of a ram or a brush, and is preferably actuated pneumatically but may, if desired, be hydraulically actuated.

Figure 3:
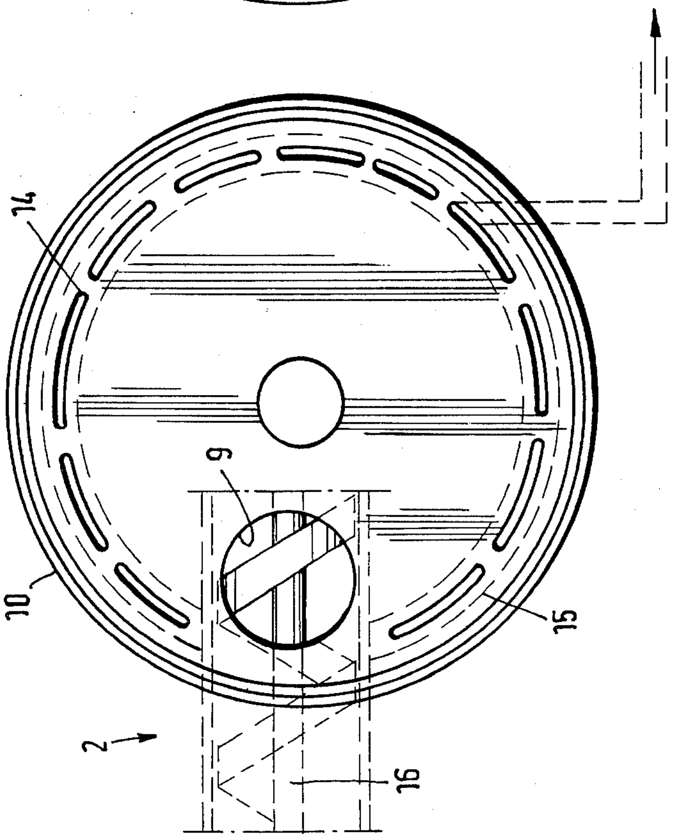

In FIG. 2, there is shown a filler tube 3 having a stocking-like filter hose 51 secured thereto. This tube prevents liquid in the mixture from spraying out of the containers 4, 5 and 6 during the filling thereof. If such a filler tube 3 is used, it must be ensured, by a suitable device (not shown), that both it and the hose 51 are capable of being lowered into the respective containers and being removed therefrom. In FIG. 3, there is shown a better view of the stationary disc 10 showing the discharge apertures 14 provided therein.

Figure 4:
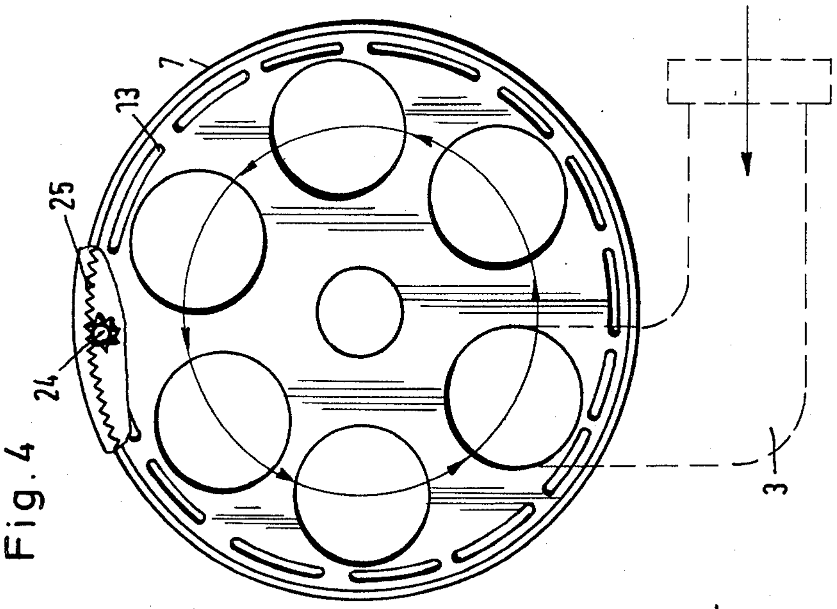

FIG. 4 is a plan view of an alternative form of a receiver turntable 7. This turntable is provided with six containers of the same type as the containers 4, 5 and 6 shown in FIG. 1. This arrangement increases the treatment capacity of the device and/or provides a longer dwell period for the mixture to be separated in the preliminary treatment station 1 whilst still enabling the extraction screw press 2 to be operated continuously.

By means of a drive pinion 24, which is rotated by a drive unit (not shown) and which engages in an internal toothing 25 provided on the receiver turntable 7, the containers located on the receiver turntable 7 are displaced in a timed sequence, both below the filler tube 3 and above the aperture 9 provided in the stationary disc 10 and may thus be filled and emptied in sequence.

Figures 5, 6, 7:
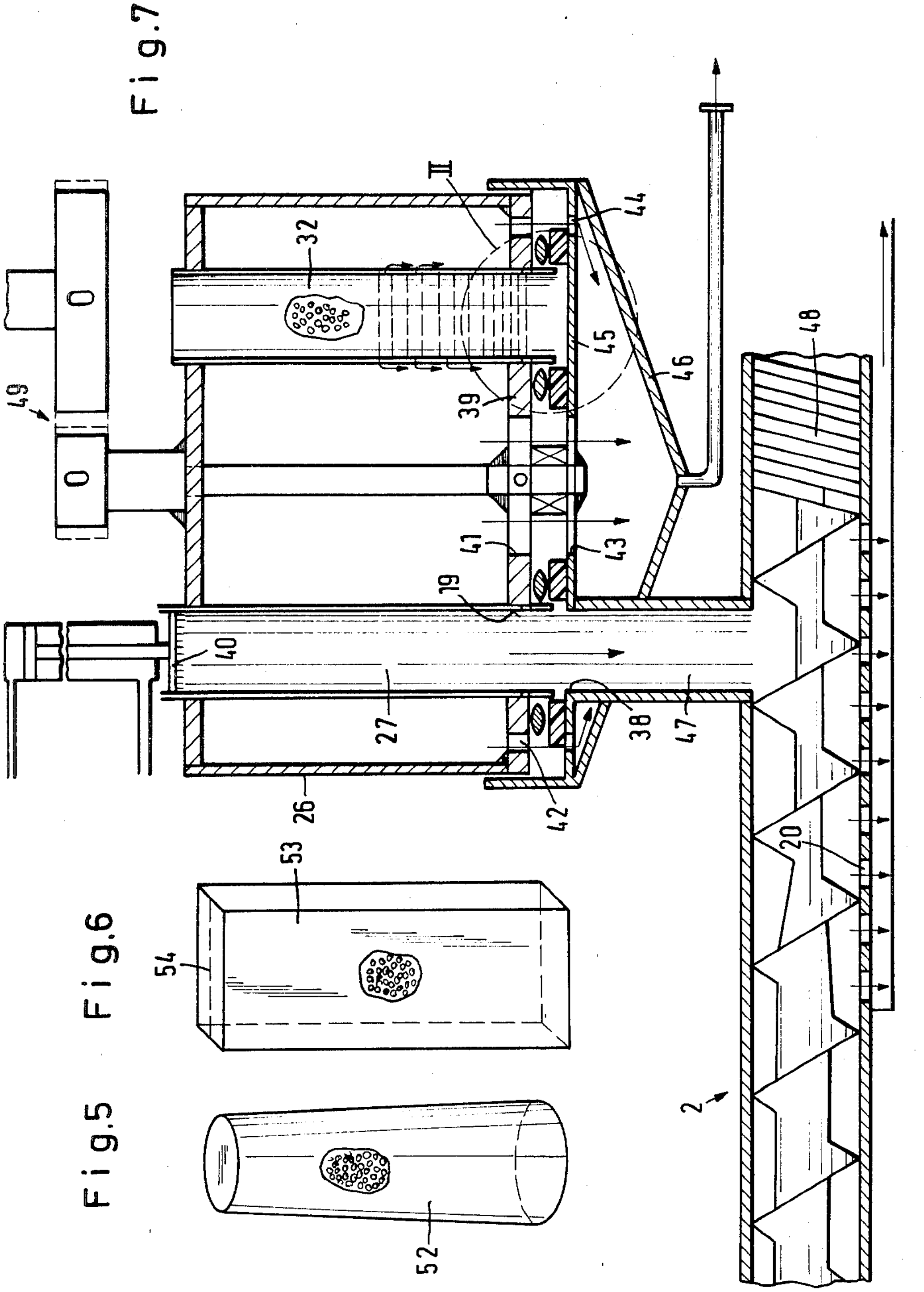

A preferred embodiment of the invention is shown in FIG. 7. In this embodiment, the receiver turntable 39 is in the form of a cylindrical container having perforated containers 27 to 36 inclusive (more clearly seen in FIG. 9) arranged therein in a circular arrangement.

As shown in FIG. 7, the perforated sheet container 27 is located in the emptying position in which its outlet is located above an aperture 38 provided in the base of the turntable 39. The discharge of the contents of the container located above the aperture 38 may be assisted by a downward-displacement of the ram or plunger 40 and, at the same time, cleaning of the walls of the perforated container may be achieved.

The extracted liquid emerges from the perforations provided in the walls of the containers and flows through either a central discharge aperture 41 or through slotted holes 42 provided in the base plate 39 and then through either a central aperture 43 or slotted holes 44 provided in the stationary disc 45. The liquid then passes into a collection funnel 46, located beneath the stationary disc 45, and is discharged.

The preliminary treated contents of the perforated container 27 is then emptied into the receiver chamber 47 of the screw press. The liquid extracted in the screw press is discharged through filter apertures 20. To prevent the mixture to be extracted from entering the storage area (not shown) of the screw press, the press is provided with a back feed thread 48 which builds up a counter-pressure and thereby prevents the storage area from becoming contaminated.

Figure 9:
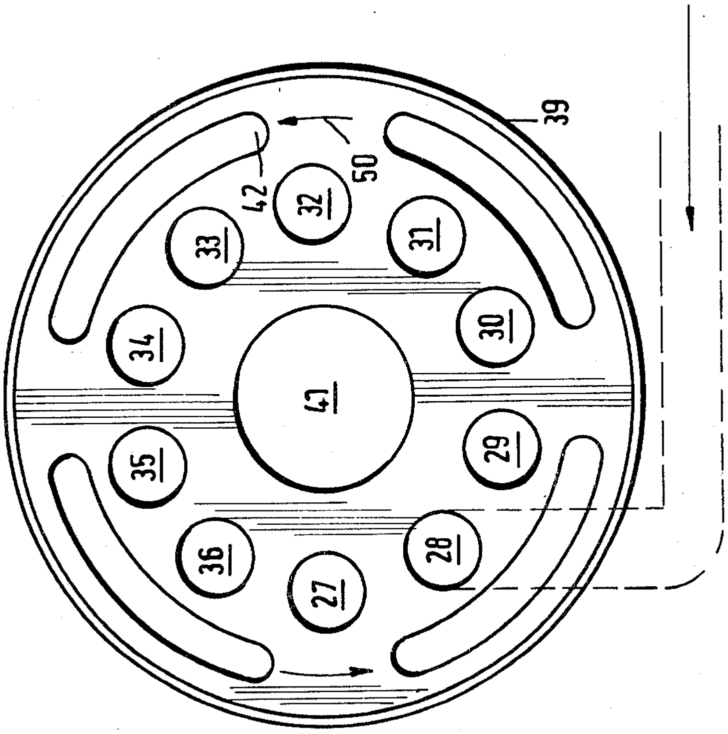
FIG. 9 is a plan view of the base plate of the receiver turntable shown in FIG. 7.
Figure 8:
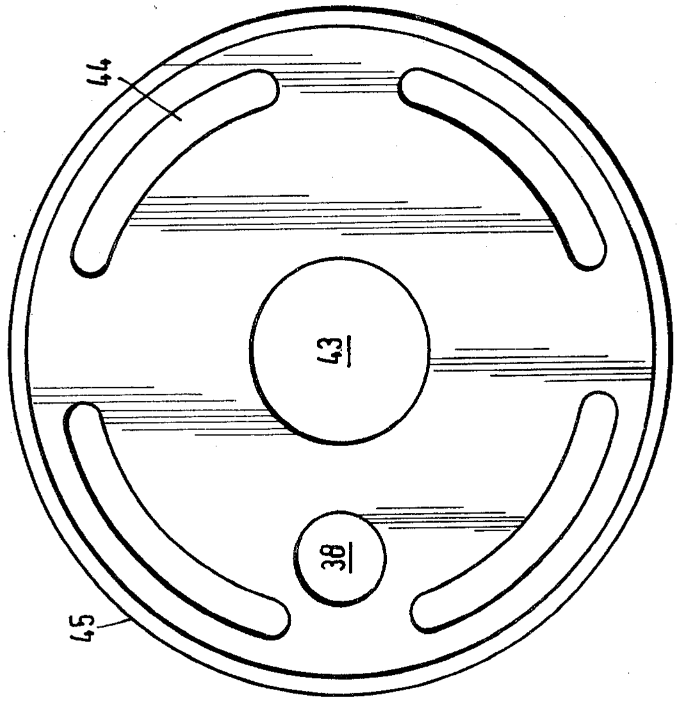
FIG. 8 is a plan view of a stationary disc forming part of the preliminary treatment station shown in FIG. 7.

The cylindrical containers are, in turn, displaced in the direction of arrow 50 in FIG. 9 so as to become located above the aperture 38 by means of a cogwheel drive device 49, so that the content of the perforated container, which has the most liquid removed therefrom in the preliminary treatment, is transferred to the receiver chamber 47.

Since, as can be seen from FIG. 7, the preforated containers are designed so as to be interchangeable they may also be removed at intervals for cleaning or repair without the preliminary treatment station needing to be put out of operation. In such a case, the receiver turntable 39 merely needs to be rotated so that the empty portion of the turntable from which the container has been removed is not stopped either below the mixture feed or above the discharge aperture.

FIG. 5 shows a conical perforated container 52 which is provided having an inward taper of about 5° from its lower to its upper end. A container of this type has the advantage that solid components which, in the upper portion of the container may have adhered to the wall of the container become detached therefrom when the level in the container drops due to the force of gravity. These solid components are therefore discharged downwardly, and the container, is, therefore largely self-cleaning.

FIG. 6 shows a perforated container 53 which is rectangular in cross-section. This arrangement provides the advantage that liquid is removed more satisfactorily from the inner zone because the spacing of the centre of the container from any wall is small. This is indicated by the central line 54. The containers could also be oval in cross-section.

A device as shown in FIG. 7, because it is provided with ten perforated containers 27 to 36, has a high capacity for receiving material to be treated and the preliminary liquid removal is effected in a continuous manner. Since both the stationary disc 45 and the base plate 39 are, desirably, manufactured from a metal having low coefficients of friction, the energy needing to be supplied for the continued, synchronous movement of the containers or the receiver turntable 11, is almost exclusively that necessary for operating the drive means for producing the rotational movement. Compared with other mechanical devices for preliminary liquid removal such as, for example, screen belt presses, decanters or double-screw presses, low operational costs are achieved.

In the embodiment shown in FIG. 10, a seal 61 is mounted on the lower rim of a tubular perforated container 32, which seal 61 slides on the stationary disc 45 during the timed sequence rotation of the receiver turntable 39.

FIG. 11 shows an embodiment in which a receiver ring 57 for receiving the perforated sheet containers is shown in the through aperture 19 provided in the receiver turntable 39. The receiver ring 57 is welded to the receiver turntable 39 and has a rim 58 which extends downwardly beyond the receiver turntable. A resilient seal 60, having a low coefficient of friction, is arranged around the projecting rim 58. The resilient seal 60 extends beyond the lower edge 59 of the receiver ring 58 and, as a result the receiver ring 58 is prevented from coming into abrasive contact with the stationary disc 45.

The embodiment shown in FIG. 12 also includes a receiver ring 57 having a rim 58. A resilient roller ring or cage 56 is located around the rim 58 of the receiver ring 57 which presses a plastics material seal 55 towards the stationary disc. Instead of the resilient ring 56, a rubber profile or the like may also be used, such a profile generating tension forces. This embodiment is particularly advantageous if liquid is to be removed in a preliminary treatment from liquid-solid mixtures having very small solid components contained therein. This is because the plastics seal 55 is pressed strongly towards the stationary disc by the roller ring 56, and, consequently, extremely good sealing is achieved.

We claim:

1. An extraction device for extracting solid matter from a solid-liquid mixture such as sewage sludge or paper pulp, said device comprising a preliminary treatment station, said treatment station including mixture feed means and mixture outlet means, and an extraction device located downstream of, and in fluid flow communication with, said outlet means of said preliminary treatment station, said preliminary treatment station comprising a plurality of perforated containers, each said container having an open first end and an open second end, each said first end being alignable with said mixture feed means, a receiver turntable supporting said second end of each said container, a plurality of through aperture defining means formed in said turntable, said second end of each said container being located in a respective one of said through aperture defining means, drive means associated with said turntable for displacing said first end of each said container into alignment with said mixture feed means, stationary disc means concentrically disposed beneath said turntable, eccentrically disposed aperture defining means formed in said disc means, said through aperture defining means in said turntable being alignable, by said drive means, with said aperture defining means in said disc means, the cross-sectional area of said second end of each said container corresponding to the cross-sectional area of said aperture defining means in said disc means, collection means associated with said disc means for collecting separated liquid passing through the perforations in said perforated container, and discharge means in fluid flow communication with said collection means for discharging said separated liquid.

2. A device as recited in claim 1 wherein said preliminary treatment station is disposed above said extraction device, said extraction device being a screw press, a screen belt press or a decanter, mixture inlet means formed in said extraction device, said eccentrically disposed aperture defining means being circular in cross-section and said mixture inlet means in said extraction device also being circular in cross-section and having a cross-sectional area corresponding to that of said eccentrically disposed aperture defining means.

3. A device as recited in claim 1 wherein said perforated containers are each detachably located in said aperture defining means in said turntable so as to be replaceable or interchangeable and mixture inlet means are formed in said extraction device, said container being cylindrical, conical, oval or rectangular in shape, said eccentrically disposed aperture defining means in said disc means and said mixture inlet means corresponding, in both shape and cross-sectional area, to said shape and cross-sectional area of said second end of said containers.

4. A device as recited in claim 1 additionally comprising fabric screen or filter cloth means disposed on the internal surface of each said container.

5. An extraction device as recited in claim 4 additionally comprising sealing ring means for sealing said projecting rim means against said stationary discs, said sealing ring means being resilient and being made of plastics material, said sealing means being disposed around said projecting rim means and projecting downwardly beyond said rim means to abut said stationary disc means.

6. A device as recited in claim 5 additionally comprising roller cage or ring means, said roller cage or ring means being disposed between sealing ring means and the underside of said receiver turntable.

7. A device as recited in claim 1 additionally including ram means aligned with said first end of each said container—when said container and said turntable is displaced into a predetermined position, said ram means comprising a piston rod, pneumatic or hydraulic drive means for displacing said piston rod and brush or plunger means mounted on said rod engageable with the interior of said container when said piston rod is displaced.

8. A device as recited in claim 1 wherein said receiver turntable is in the form of a cylindrical container, said through aperture defining means in said turntable for receiving said containers being disposed in a circular arrangement, the device additionally comprising cover means for said container and drive means centrally disposed on said cover means for rotating said receiver turntable.

9. A device as recited in claim 1 wherein discharge aperture defining means are centrally formed in said receiver turntable and in said stationary disc, said discharge aperture defining means in said turntable being aligned with said discharge aperture defining means in said disc.

10. A device as recited in claim 1 wherein discharge aperture defining means are peripherally formed in said receiver turntable and in said stationary disc, said discharge aperture defining means in said turntable being aligned with said discharge aperture defining means in said disc.

11. A device as recited in claim 9 or 10 wherein said separated liquid discharge means is disposed below said disc means, said discharge means communicating with said discharge aperture defining means in said disc.

12. A device as recited in claim 11 wherein said separated liquid discharge means is a funnel-shaped collection container.

13. A device as recited in claim 9 or 10, wherein said separated liquid discharge means is an annular, encircling discharge channel.

14. A device as recited in claim 1 wherein said mixture feed means comprises a filler tube having a lower end said tube being vertically displaceable, and a stocking-like filler hose secured to said lower end of said filler tube.

15. A device as recited in claim 1 additionally comprising sealing means, said sealing means sealing the periphery of said second end of each said container located in said respective through aperture defining means from said disc means.

16. An extraction device as recited in claim 1 additionally comprising receiver ring means, said receiver ring means receiving said second end of each said container and being located in said through aperture defining means in said turntable, projecting rim means being formed on said receiver ring means, said projecting rim means being directed towards said stationary disc and being sealable thereagainst.

* * * * *